US009877305B2

(12) United States Patent
Krishnamurthy et al.

(10) Patent No.: US 9,877,305 B2
(45) Date of Patent: Jan. 23, 2018

(54) METHODS FOR CODEBOOK SUB-SAMPLING

(71) Applicant: Google Technology Holdings LLC, Mountain View, CA (US)

(72) Inventors: Sandeep H. Krishnamurthy, Mountain View, CA (US); Tyler A. Brown, Mundelein, IL (US); Robert T. Love, Barrington, IL (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/235,429

(22) Filed: Aug. 12, 2016

(65) Prior Publication Data

US 2016/0353413 A1    Dec. 1, 2016

Related U.S. Application Data

(62) Division of application No. 14/292,987, filed on Jun. 2, 2014, now Pat. No. 9,432,101.

(Continued)

(51) Int. Cl.
*H04B 7/04* (2017.01)
*H04W 72/02* (2009.01)
(Continued)

(52) U.S. Cl.
CPC .......... *H04W 72/02* (2013.01); *H04B 7/0413* (2013.01); *H04B 7/0456* (2013.01);
(Continued)

(58) Field of Classification Search
CPC . H04B 7/00; H04B 7/02; H04B 7/022; H04B 7/024; H04B 7/026; H04B 7/04;
(Continued)

(56) References Cited

U.S. PATENT DOCUMENTS 8,908,791 B2 * 12/2014 Mazzarese ............. H04B 7/063
370/203
8,942,302 B2   1/2015 Krishnamurthy et al.
(Continued)

FOREIGN PATENT DOCUMENTS

| EP | 2437408 A1 | 4/2012 |
|---|---|---|
| WO | 2012/093742 A1 | 7/2012 |
| WO | 2013/051908 A2 | 4/2013 |

OTHER PUBLICATIONS

European Patent Office; International Search Report and Written Opinion; International Application No. PCT/US2014/041120; dated Sep. 17, 2014.

(Continued)

*Primary Examiner* — Siu Lee
(74) *Attorney, Agent, or Firm* — Faegre Baker Daniels LLP

(57) ABSTRACT

Disclosed are methods for codebook sub-sampling. In various implementations, a wireless terminal receives a reference signal, determines, based on the reference signal, a first precoding index $i_2$ for a first subband and a second precoding index $i'_2$ for a second subband. The wireless terminal transmits a representation of $i_2$ and a representation of $i'_2$ to a base station. In various implementations, $i'_2$ belongs to the set $S_{i_2}$ which, in one implementation, equals $\{mod(i_2-K_1+k,K), k=0, 1, \ldots, K_2\}$, where $K_1>1$, and where $K_2>1$ and $K>1$ are integers. According to an implementation, the wireless terminal receives the reference signal from a first base station and transmits the representations of $i_2$ and $i'_2$ to a second base station.

12 Claims, 5 Drawing Sheets

Related U.S. Application Data

(60) Provisional application No. 61/832,206, filed on Jun. 7, 2013.

(51) Int. Cl.

| | | |
|---|---|---|
| *H04B 7/0456* | (2017.01) | |
| *H04B 7/06* | (2006.01) | |
| *H04B 7/0413* | (2017.01) | |
| *H04L 5/00* | (2006.01) | |
| *H04W 72/04* | (2009.01) | |

(52) U.S. Cl.
CPC ......... *H04B 7/0478* (2013.01); *H04B 7/0486* (2013.01); *H04B 7/065* (2013.01); *H04B 7/0617* (2013.01); *H04B 7/0626* (2013.01); *H04B 7/0632* (2013.01); *H04B 7/0639* (2013.01); *H04B 7/0663* (2013.01); *H04L 5/0051* (2013.01); *H04W 72/0413* (2013.01)

(58) Field of Classification Search
CPC .. H04B 7/0404; H04B 7/0408; H04B 7/0413; H04B 7/0417; H04B 7/0421; H04B 7/0456; H04B 7/0478; H04B 7/0482
USPC ....... 375/295, 316, 259, 260, 285, 296, 267, 375/299, 347, 349
See application file for complete search history.

(56) References Cited

U.S. PATENT DOCUMENTS

| | | |
|---|---|---|
| 9,184,818 B2 | 11/2015 | Kim et al. |
| 9,344,173 B2 | 5/2016 | Kim et al. |
| 2011/0249637 A1 | 10/2011 | Hammarwall et al. |
| 2012/0069917 A1 | 3/2012 | Liu et al. |
| 2012/0076023 A1 | 3/2012 | Ko et al. |
| 2012/0076028 A1 | 3/2012 | Ko et al. |
| 2012/0076236 A1 | 3/2012 | Ko et al. |
| 2012/0087425 A1* | 4/2012 | Gomadam ........... H04B 7/0417 375/260 |
| 2012/0113830 A1 | 5/2012 | Zhu et al. |
| 2012/0218948 A1 | 8/2012 | Onggosanusi et al. |
| 2012/0275500 A1* | 11/2012 | Wang .................. H04B 7/0641 375/219 |
| 2013/0039284 A1 | 2/2013 | Marinier et al. |
| 2013/0058234 A1* | 3/2013 | Yang .................... H04L 27/261 370/252 |
| 2013/0077660 A1 | 3/2013 | Ko et al. |
| 2013/0107861 A1 | 5/2013 | Cheng et al. |
| 2013/0114656 A1 | 5/2013 | Sayana et al. |
| 2013/0182750 A1 | 7/2013 | Zhang et al. |
| 2013/0033795 A1 | 12/2013 | Falconetti et al. |
| 2014/0016549 A1 | 1/2014 | Novlan et al. |
| 2014/0092787 A1* | 4/2014 | Han .................. H04W 52/0258 370/280 |
| 2014/0328422 A1 | 11/2014 | Chen et al. |
| 2014/0355705 A1 | 12/2014 | Chen et al. |
| 2014/0362938 A1 | 12/2014 | Krishnamurthy et al. |

OTHER PUBLICATIONS

Samsung: "Draft CR on RI-Reference CSI Process for Periodic Feedback", 3GPP Draft; R1-130277 CR on R1-Reference Process_Final, 3rd Generation Partnership Project (3GPP), Mobile Competence Centre; 650, Route Des Lucioles; F-06921 Sophia-Antipolis Cedex; France; vol. RAN WG1, No. St Julian; Jan. 28, 2013-Feb. 1, 2013; Jan. 19, 2013.

Nokia et al.: "Detailed PUCCH CSI feedback signaling design", 3GPP Draft; R1-105533, 3rd Generation Partnership Project (3GPP), Mobile Competence Centre; 650, Route Des Lucioles; F-06921 Sophia-Antipolis Cedex; France; vol. RAN WG1, No. Xi'an; Oct. 11, 2010; Oct. 6, 2010.

QUALCOMM Incorporated; "Design and configuration of the enhanced 4Tx codebook for Ranks 1 and 2"; 3GPP Draft; R1-132482; Mobile Competence Centre; 650, Route Des Lucioles; F-06921 Sophia-Antipolis Cedex; France; vol. RAN WG1, No. Fukuoka, Japan; May 20, 2013-May 24, 2013; May 11, 2013.

3GPP TSG RAN WG1 #73, R1-132627 "Feedback Reduction Techniques for PUSCH Mode 3-2 for 4Tx" AT & T, Fukuoka, Japan, May 20-24, 2013, 5 pages.

3GPP TSG RAN WG1 #73, R1-131944 "Finalizing feedback channel of 4Tx" Texas Instruments, Fukuoka, Japan, May 20-24, 2013, 3 pages.

3GPP TSG RAN WG1 #73, R1-132485 "Remaining issues of eMIMO CSI feedback" Qualcomm Incorporated, Fukuoka, Japan, May 20-24, 2013, 3 pages.

3GPP TSG RAN WG1 #73, R1-132049 "Details of CSI feedback modes for DL MIMO Enhancement" Alcatel-Lucent, Fukuoka, Japan, May 20-24, 2013, 3 pages.

3GPP TS 36.213 V10.4.0 (Dec. 2011), 3rd Generation Prtnership Project; Technical Specification Group Radio Access Network; Evolved Universal Terrestrial Radio Access (E-UTRA); Physical layer procedures (Release 10) Section 7.2.2, pp. 51-63.

European Patent Office; European Examination Report; Application No. 14734690.2; dated Feb. 9, 2017.

AT&T Feedback Reduction Techniques for PUSCH Mode 3-2 for 4Tx; 3GPP Draft; R1-132627; vol. RAN WG1; Fukoka, Japan; May 12, 2013.

* cited by examiner

METHODS FOR CODEBOOK SUB-SAMPLING

CROSS-REFERENCE TO RELATED APPLICATIONS

The present application is a divisional of U.S. Non-Provisional patent application Ser. No. 14/292,987, filed Jun. 2, 2014, and entitled METHODS FOR CODEBOOK SUB-SAMPLING, which claims priority to U.S. Provisional Patent Application No. 61/832,206, filed Jun. 7, 2013, and entitled METHOD FOR FEEDBACK COMPRESSION FOR SINGLE USER AND MULTI USER MIMO OPERATION, the contents of which are incorporated herein by reference.

TECHNICAL FIELD

The present disclosure is directed to wireless communications and, more particularly, to methods of codebook sub-sampling.

BACKGROUND

A Multi-Input Multi-Output ("MIMO") communication system uses a plurality of channels in a spatial area. Antenna arrays that have multiple transmission antennas can increase the capacity of data transmission through MIMO-transmission schemes.

In a MIMO-communication system, base stations and wireless terminals use codebooks for precoding information streams prior to transmission. Each codebook contains a number of elements. Each element of a codebook is a vector or a matrix, termed a precoding vector or a precoding matrix, respectively. To optimize communication with a base station, a wireless terminal determines various characteristics of the communication channel between the base station and itself, selects what it determines to be the best matrix or vector from a codebook, and indicates this selection to the base station. The base station may (but is not required to) use that matrix or vector for precoding data streams prior to transmission to the wireless terminal.

To indicate to the base station which matrix or vector it has selected, the wireless terminal transmits one or more codebook indices to the base station. A codebook index is an index of a precoding matrix. For example, given a first precoding matrix $W_1$ and a second precoding matrix $W_2$, $W_1$ can be at least partially represented by a first index $i_1$, and $W_2$ can be at least partially represented by a second index $i_2$. Put another way, the first codebook index $i_1$ can be used to identify or point to an element in a first codebook of a set of $W_1$ matrices. The second codebook index $i_2$ can be used to identify or point to an element in a second codebook of a set of $W_2$ matrices. Together, $i_1$ and $i_2$ jointly determine a precoding matrix, $W$, with a product structure, i.e., $W=W_1 W_2$.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Figure 1:
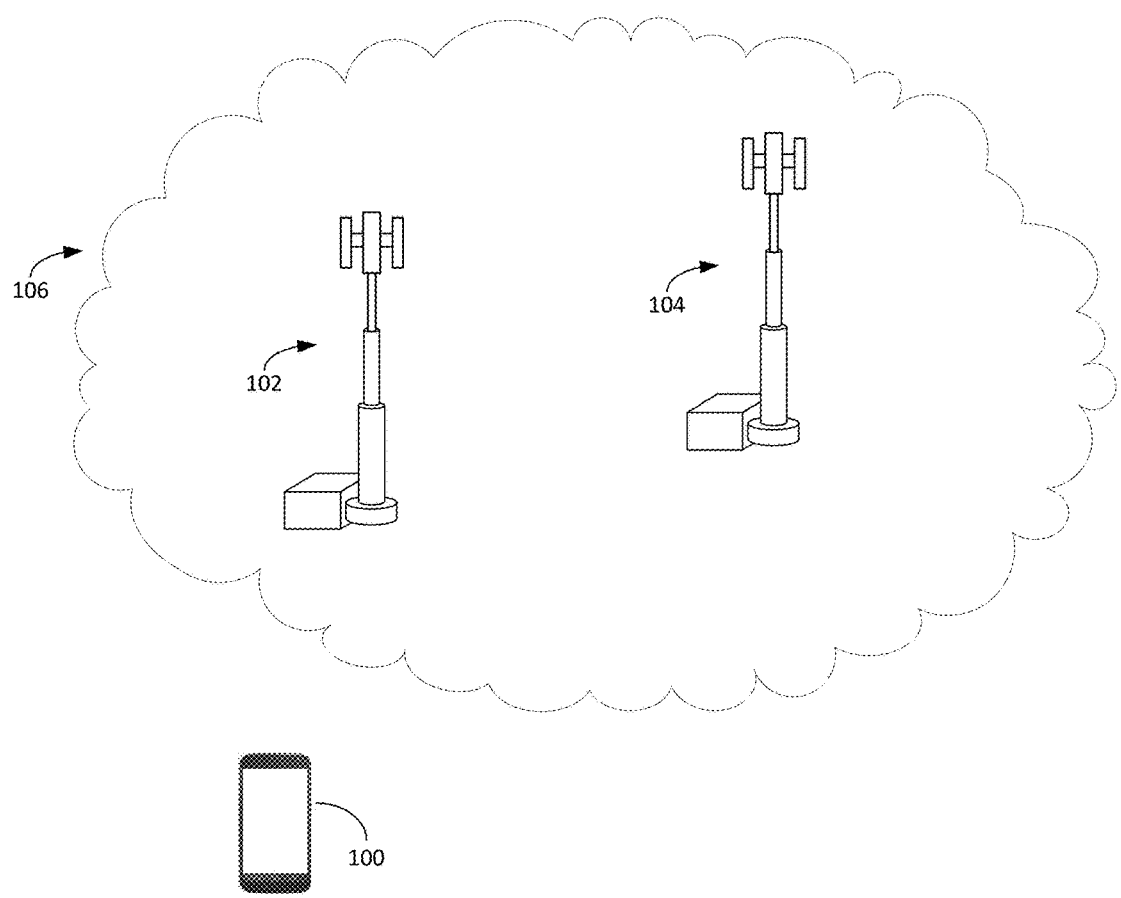
FIG. 1 is a block diagram of a communication system.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure describes methods for codebook sub-sampling. In various embodiments, a wireless terminal receives a reference signal, determines, based on the reference signal, a first precoding index $i_2$ for a first subband and a second precoding index $i'_2$ for a second subband. The wireless terminal transmits a representation of $i_2$ and a representation of $i'_2$ to a base station. In various embodiments, $i'_2$ belongs to the set $S_{i_2}$, which, in one implementation, equals $\{\mod(i_2-K_1+k,K), k=0, 1, \ldots, K_2\}$, where $K_1 > 1$ and $K_2 > 1$ and $K > 1$ are integers. According to an embodiment, the wireless terminal receives the reference signal from a first base station and transmits the representations of $i_2$ and $i'_2$ to a second base station.

Turning to FIG. 1, a wireless terminal 100 according to an embodiment is configured to communicate wirelessly with both a first base station 102 and a second base station 104 (either one at a time or in parallel). The first base station 102 and the second base station 104 are two of many base stations of a wireless network 106 and are connected to other parts of the wireless network 106 by one or more well known mechanisms. Possible implementations of the wireless network 106 include a cellular network (such one that follows standards set by the Third Generation Partnership Project ("3GPP")) and an Institute of Electrical and Electronics Engineers 802.11x network. Possible implementations of the wireless terminal 100 include a wireless telephone, a cellular telephone, a personal digital assistant, a pager, a personal computer, a selective call receiver, a tablet computer, a camera, an automotive product, a household product, a television, and a radio. The wireless terminal 100 is configured to carry out the various methods described herein.

Possible implementations of the first base station 102 and the second base station 104 include a macro base station, remote radio read ("RRH"), relay node, pico base station, femto base station, network transmission point, and network reception point. For example, the first base station 102 can be a macro base station, and the second base station 104 can be RRH. Furthermore, the first base station 102 and the second base station 104 can be different logical or physical entities or they can be the same.

Figure 2:
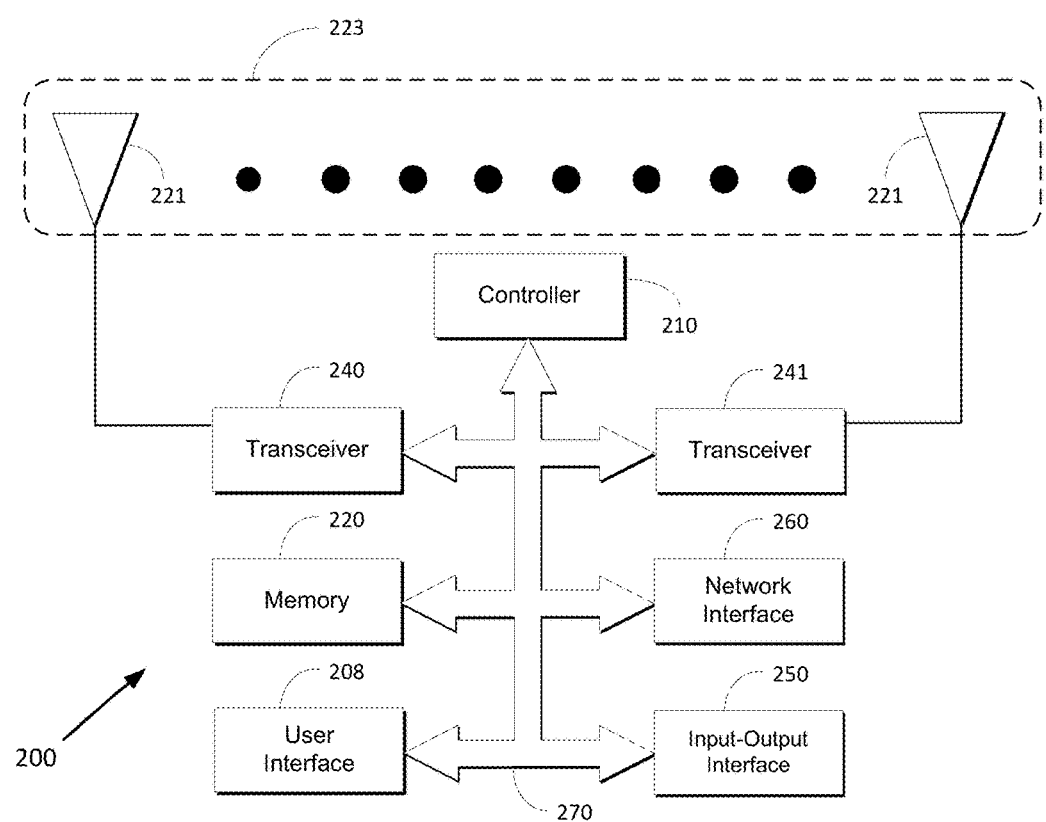
FIG. 2 is a block diagram of a representative wireless terminal or base station.

FIG. 2 illustrates a device 200 that is a possible implementation of the wireless terminal 100, the first base station 102, or second base station 104 of FIG. 1. The device 200 includes a user interface 208, a controller 210, a memory 220 (which can be implemented as volatile memory or non-volatile memory), a first transceiver 240, a second transceiver 241, an input-output interface 250, a network interface 260, and one or more antennas 221 arranged as a MIMO array 223. The controller 210 retrieves instructions from the memory 220 and operates according to those instructions to provide outgoing data to and receive incoming data from the first transceiver 240 and the second transceiver 241. The controller 210 also receives data from and sends data to external devices via the input-output interface 250. If the device 200 is a base station, then the network interface 260 is coupled to a backhaul network, and the controller 210 can transmit data to other elements of the wireless network 106 (FIG. 1) via the backhaul network (not shown).

During operation, one or more of the transceivers 240 and 241 receives data from the controller 210 and transmits Radio Frequency ("RF") signals representing the data via one or more of the antennas 221. Similarly, each transceiver receives RF signals via one or more of the antennas 221, converts the signals into the appropriately formatted data, and provides the data to the controller 210.

Each of the elements of the device 200 is communicatively linked to the other elements via data pathways 270. Possible implementations of the data pathways 270 include wires, conductive pathways on a microchip, and wireless connections. Possible implementations of the controller 210 include a microprocessor, a microcontroller, and a computer. Possible implementations of the network interface 260 include a modem, a network interface card, and a wireless local area network chipset.

In an embodiment, the wireless terminal 100 transmits data and certain types of control information to a base station (e.g., the first base station 102 or the second base station 104) on a physical uplink shared channel ("PUSCH"). The wireless terminal 100 transmits control information to a base station on a physical uplink control channel ("PUCCH"). Data carried by the PUSCH includes user data such as video data (e.g., streaming video) or audio data (e.g., voice calls).

In an embodiment, a base station of the wireless network 106 (such as the first base station 102) transmits a channel-state information reference signal ("CSI-RS"), which the wireless terminal 100 uses for the purpose of determining the state of the channel. The wireless terminal 100 feeds back information regarding the determined channel state in the form of a channel-state information ("CSI") report. Each CSI report includes one or more of a channel-quality indicator ("CQI"), a precoding-matrix indicator ("PMI"), a precoder-type indication ("PTI"), and a rank indicator ("RI"). The wireless terminal 100 uses the PMI to indicate, to the base station, a recommended precoder matrix for the downlink transmissions, the RI to recommend the transmission rank (number of transmission layers) that is preferably to be used for downlink transmission to the wireless terminal 100, and the PTI to signal the contents and timing of future CSI reports. The RI and the PMI may be separately encoded (e.g., mapped to different sets of bits in a message) or jointly encoded. The base station uses higher-layer signaling to indicate to the wireless terminal 100 things such as the sub-frame periodicity, sub-frame offset (relative to a radio frame boundary), and the number of CSI-RS antenna ports that are configurable. In some embodiments, the base station transmits a cell-specific reference signal, which the wireless terminal 100 can use for same purposes it would otherwise use the CSI-RS.

In an embodiment, the PMI corresponds to the first index ($i_1$) or the second index ($i_2$). The PMI, and thus the first index ($i_1$) and the second index ($i_2$), is conditioned on the most recent RI. For example, the wireless terminal 100 may determine a third precoding index based on the reference signal. In this example, the third precoding index points to a third precoding matrix of a second codebook, and the third precoding matrix commonly applies to the first subband and the second subband.

In an embodiment, the network 106 is a 3GPP network that uses a Release 12 precoding scheme. In one implementation for a Release 12 precoding scheme for four transmit antenna ports and rank 1-2 (based on the product $W_1W_2$ structure), each PMI value corresponds to a pair of codebook indices ($i_1$, $i_2$). In an embodiment, the channel quality information represented by the CQI refers to one or more spatial layers and is conditioned on the precoding indices $i_1$ and $i_2$. One implementation of these codebook indices is given in Table 1 for 1-layer CSI reporting using antenna ports 0 to 3 or 15 to 18, and given in Table 2 for 2-layer CSI reporting using antenna ports 0 to 3 or 15 to 18, where $\varphi_n = e^{j\pi n/2}$, $\theta_r = e^{j\pi r/16}$, and $v_m = [1 \ e^{j2\pi m/32}]^T$.

TABLE 1

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{i_1,0,0}^{(1)}$ | $W_{i_1,1,0}^{(1)}$ | $W_{i_1,2,0}^{(1)}$ | $W_{i_1,3,0}^{(1)}$ | $W_{i_1+8,0,1}^{(1)}$ | $W_{i_1+8,1,1}^{(1)}$ | $W_{i_1+8,2,1}^{(1)}$ | $W_{i_1+8,3,1}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{i_1+16,0,2}^{(1)}$ | $W_{i_1+16,1,2}^{(1)}$ | $W_{i_1+16,2,2}^{(1)}$ | $W_{i_1+16,3,2}^{(1)}$ | $W_{i_1+24,0,3}^{(1)}$ | $W_{i_1+24,1,3}^{(1)}$ | $W_{i_1+24,2,3}^{(1)}$ | $W_{i_1+24,3,3}^{(1)}$ | where $W_{m,n,r}^{(1)} = \frac{1}{2} \begin{bmatrix} v_m \\ \varphi_n \theta_r v_m \end{bmatrix}$

TABLE 2

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| | $i_2$ | | | |
|---|---|---|---|---|
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ | where $W_{m,m',n}^{(2)} = \frac{1}{\sqrt{8}} \begin{bmatrix} v_m & v_{m'} \\ \varphi_n v_m & -\varphi_n v_{m'} \end{bmatrix}$ For 4 antenna ports {0,1,2,3} or {15,16,17,18}, a first PMI value of $n_1 \in \{0, 1, \ldots, f(\upsilon)-1\}$ and a second PMI value of $n_2 \in \{0, 1, \ldots, g(\upsilon)-1\}$ correspond to the codebook indices $n_1$ and $n_2$ given in Table 1 for $\upsilon$, the associated RI value, equal to one and Table 2 for $\upsilon$ equal to two, $f(\upsilon)=16$, $\upsilon \in \{1,2\}$, and $g(\upsilon)=16$, $\upsilon \in \{1,2\}$.

In an embodiment, the $W_2$ matrices of a codebook are ordered based on distinct beam groups and then ordered using intra-group ordering based on different co-phasing assumptions. One implementation of this ordering for $i_2$ is shown in the codebooks in Table 1 and Table 2, in which the precoding matrices within a beam group (defined by the vector $v_m$ (for rank 1) and the pair of vectors ($v_m$, $v_{m'}$) (for rank 2)) differ in only the co-phasing terms defined by quantities $\varphi_n$ and $\theta_4$. For example, assume the selected index is $i_2$, $n_{k-1}=5$ (indexed starting from 0) for subband k−1. The wireless terminal 100 can select the $W_2$ index $n_k$ for subband k from the range $[n_{k-1}-3, n_{k-1}+4]$ (ignoring edge conditions). More generally, for any index $i_2$ for subband m, the wireless terminal 100 selects index $i_2$ for subband n from the set of indices $\{mod(i_2-3+k, 16), k=0, 1, \ldots, 7\}$. In an embodiment, n is not equal to m (e.g., n=m+1 or n=m−1). The wireless terminal 100 can then encode the resulting selection using 3 bits. The 3-bit differential codebook index $i_2'$ for subband n can be $i_2'(n)=k$. Thus, the codebook index $i_2$ for subband n can then be given as $i_2(n)=mod(i_2(n-1)-3+i_2'(n), 16)$. As a result, for any $W_2$ feedback $i_2(k-1)$ that the wireless terminal 100 selects for subband k−1, the wireless terminal 100 selects from the indexes in the set of $\{mod(i_2(k-1)-3+q, 16), q=0, 1, \ldots, 7\}$ for $i_2$ feedback in subband k. This limit on the possible selection of $i_2$ means that, while the first subband (i.e., the subband with the lowest frequency index) requires 4 bits for $i_2$, the remainder of the subbands require only 3 bits for $i_2$ (3 bits $i_2'$ for the differential representation).

In another embodiment, the wireless terminal 100 determines a differential PMI starting out from the center subband (a subband at the center or close to the center of the set of subbands or the system bandwidth with full 4-bits codebook index $i_2$ representation) proceeding in both directions. In still another embodiment, the wireless terminal 100 determines a full 4-bit feedback representation of codebook index $i_2$ for a subset of the subbands and a 3-bit differential representation $i_2'$ of codebook index $i_2$ for the remaining subbands. For example, the subset of the subbands for full 4-bit feedback representation of codebook index $i_2$ may be the {first subband, center subband} or {first subband, center subband, last subband}.

Consider the following rank-1 codebook solution ("Solution 1"):

$$W_1 = \begin{bmatrix} X_n & 0 \\ 0 & X_n \end{bmatrix} \text{ where } n = 0, 1, \ldots, 15$$

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32}$$

For rank 1, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\}$ and $(Y_1, Y_2) = (e_i, e_k) \in$ $\{(e_1, e_1), (e_2, e_2), (e_3, e_3), (e_4, e_4), (e_1, e_2), (e_2, e_3), (e_1, e_4), (e_2, e_4)\}.$ Additionally, consider the following rank-1 codebook solution ("Solution 2"):

$$W_1 = \begin{bmatrix} X_n & 0 \\ 0 & X_n \end{bmatrix} \text{ where } n = 0, 1, \ldots, 15$$

$$X_n = \begin{bmatrix} 1 & 1 & 1 & 1 \\ q_1^n & q_1^{n+8} & q_1^{n+16} & q_1^{n+24} \end{bmatrix} \text{ where } q_1 = e^{j2\pi/32}$$

-continued

For rank 1, $$W_{2,n} \in \left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

and $Y \in \{e_1, e_2, e_3, e_4\}$ and $\alpha(i) = q_1^{2(i-1)}$;

For rank 2, $W_{2,n} \in$ $$\left\{ \frac{1}{2} \begin{bmatrix} Y_1 & Y_2 \\ Y_1 & Y_2 \end{bmatrix}, \frac{1}{2} \begin{bmatrix} Y_1 & Y_2 \\ Y_1 & -Y_2 \end{bmatrix}, \frac{1}{2} \begin{bmatrix} Y_1 & Y_2 \\ -Y_1 & Y_2 \end{bmatrix}, \frac{1}{2} \begin{bmatrix} Y_1 & Y_2 \\ -Y_1 & -Y_2 \end{bmatrix} \right\} (Y_1, Y_2) \in$$

$$\{(e_2, e_4)\}$$

and $W_{2,n} \in \left\{ \frac{1}{2} \begin{bmatrix} Y_1 & Y_2 \\ Y_1 & -Y_2 \end{bmatrix}, \frac{1}{2} \begin{bmatrix} Y_1 & Y_2 \\ jY_1 & -jY_2 \end{bmatrix} \right\} (Y_1, Y_2) \in$ $$\{(e_1, e_1), (e_2, e_2), (e_3, e_3), (e_4, e_4)\}$$

TABLE 3

| | $i_2$ | | | | | | | |
|---|---|---|---|---|---|---|---|---|
| | 0 | 1 | 2 | 3 | 4 | 5 | 6 | 7 |
| | $W_{1,0}^{(2)}$ | $W_{1,1}^{(2)}$ | $W_{1,2}^{(2)}$ | $W_{1,3}^{(2)}$ | $W_{2,0}^{(2)}$ | $W_{2,1}^{(2)}$ | $W_{2,2}^{(2)}$ | $W_{2,3}^{(2)}$ |
| | $i_2$ | | | | | | | |
| | 8 | 9 | 10 | 11 | 12 | 13 | 14 | 15 |
| | $W_{3,0}^{(2)}$ | $W_{3,1}^{(2)}$ | $W_{3,2}^{(2)}$ | $W_{3,3}^{(2)}$ | $W_{4,0}^{(2)}$ | $W_{4,1}^{(2)}$ | $W_{4,2}^{(2)}$ | $W_{4,3}^{(2)}$ | where $W_{i,k}^{(2)} = \frac{1}{2} \begin{bmatrix} e_i \\ \beta_k \alpha(i) e_i \end{bmatrix}$, $\alpha(i) = \exp(j2\pi \cdot 2(i-1)/32)$, $\beta_k = \exp(j2\pi k/4)$.

TABLE 4

| | $i_2$ | | | | | | | |
|---|---|---|---|---|---|---|---|---|
| $i_1$ | 0 | 1 | 2 | 3 | 4 | 5 | 6 | 7 |
| 0-15 | $W_{i_1,0,0}^{(1)}$ | $W_{i_1,1,0}^{(1)}$ | $W_{i_1,2,0}^{(1)}$ | $W_{i_1,3,0}^{(1)}$ | $W_{i_1+8,0,1}^{(1)}$ | $W_{i_1+8,1,1}^{(1)}$ | $W_{i_1+8,2,1}^{(1)}$ | $W_{i_1+8,3,1}^{(1)}$ |
| | $i_2$ | | | | | | | |
| $i_1$ | 8 | 9 | 10 | 11 | 12 | 13 | 14 | 15 |
| 0-15 | $W_{i_1+16,0,2}^{(1)}$ | $W_{i_1+16,1,2}^{(1)}$ | $W_{i_1+16,2,2}^{(1)}$ | $W_{i_1+16,3,2}^{(1)}$ | $W_{i_1+24,0,3}^{(1)}$ | $W_{i_1+24,1,3}^{(1)}$ | $W_{i_1+24,2,3}^{(1)}$ | $W_{i_1+24,3,3}^{(1)}$ | where $W_{m,n,r}^{(1)} = \frac{1}{2} \begin{bmatrix} v_m \\ \beta_n \alpha(r) v_m \end{bmatrix}$ $\beta_n = e^{j2\pi n/4}$ $\alpha(r) = e^{j2\pi \cdot 2r/32}$ -continued and $W_{2,n} \in \left\{ \frac{1}{2} \begin{bmatrix} Y_1 & Y_2 \\ Y_2 & -Y_1 \end{bmatrix} \right\} (Y_1, Y_2) = \{(e_1, e_3), (e_2, e_4), (e_3, e_1), (e_4, e_2)\}.$ Under both Solution 1 and Solution 2, the $W_2$ vector can be written as:

$$W_2 = \frac{1}{\sqrt{2}} \begin{bmatrix} e_i \\ \beta_2 \alpha(i) e_i \end{bmatrix},$$

where $\alpha(i) = \exp(j2\pi \cdot 2(i-1)/32)$, $i=1, 2, 3, 4$, and $\beta_2 \in \{1, -1, j, -j\}$. The index $i$ determines the beam group while $\beta_2$ determines the co-phasing terms in the equation above. With respect to the codebook embodiments of Table 1 and Table 2, where the terms $\varphi_n = e^{j\pi n/2}$, $\theta_r = e^{j\pi r/16}$, and $v_m = [1\ e^{j2\pi m/32}]^T$ were defined, the index $m$, which determines $v_m$, equivalently identifies the beam group, and indices $n$ and $r$, which determine $\varphi_n$ and $\theta_r$, identify the co-phasing terms. Therefore, ordering the $W_2$ codewords first based on beam groups and then on co-phasing terms, according to an embodiment, leads to the ordering for the $W_2$ codebook shown in Table 3 and the product $W_1 W_2$ codebook shown in Table 4.

Ordering the $W_2$ codebook in the manner shown in Table 3 ensures that vectors within the same beam group (i.e., i index) are assigned to consecutive indices. With 3 bits for $i_2$, all of the precoding vectors within the same beam group are included in the reduced precoding vector set.

To generalize, the wireless terminal 100 can determine a second precoding index $i_2$ based on the reference signal. The second precoding index $i_2$ is an index of a second codebook $W_2$. The first precoding index $i_1$ and second precoding index $i_2$ jointly determine a precoding matrix of a third codebook $W_1 W_2$, which has a product structure.

It should be noted that the rank-2 $W_2$ matrix for Solution 2 includes a diverse set of structures for beam selection and co-phasing. On the other hand, the rank-2 $W_2$ matrix for Solution 1 is more regular, in that there are only two co-phasing structures and 8 beam pairs. Therefore, in some embodiments, the two-stage ordering (first based on beam groups and next on co-phasing terms) may work better for Solution 1, rank 2, than for Solution 2, rank 2.

As an alternative, consider a subspace distance between two $W_2$ matrices, $P_1$ and $P_2$ defined as:

$$d(P_1, P_2) = \frac{1}{2} \| P_1 P_1^H - P_2 P_2^H \|_F,$$

where $\|\cdot\|_F$ denotes the Frobenius norm, and where the subspace distance determines the distance between the subspace spanned the columns of $P_1$ and $P_2$.

According to an embodiment, Table 5 tabulates the seven nearest $W_2$ matrices for each $W_2$ matrix with respect to subspace distance. The $W_2$ candidates of Table 5 are ordered with increasing subspace distance for each index $i_2$ for Solution 2, rank 2. In the case of a large number of ties (e.g., $i_2$=4, 5), the codewords in the corresponding row are selected randomly. Otherwise for most other rows, it is observed that there are only a few ties.

TABLE 5

| | Candidates for i2' are {i2} U {k_i(i2)} | | | | | | |
|---|---|---|---|---|---|---|---|
| Index i2 | k_1(i2) | k_2(i2) | k_3(i2) | k_4(i2) | k_5(i2) | k_6(i2) | k_7(i2) |
| 0 | 1 | 8 | 9 | 12 | 13 | 11 | 15 |
| 1 | 2 | 8 | 9 | 12 | 13 | 11 | 15 |
| 2 | 3 | 8 | 9 | 10 | 11 | 14 | 15 |
| 3 | 2 | 8 | 9 | 10 | 11 | 14 | 15 |
| 4 | 5 | 10 | 11 | 9 | 13 | 15 | 0 |
| 5 | 4 | 10 | 11 | 9 | 13 | 15 | 0 |
| 6 | 7 | 12 | 13 | 14 | 15 | 9 | 11 |
| 7 | 6 | 12 | 13 | 14 | 15 | 9 | 11 |
| 8 | 0 | 1 | 2 | 3 | 9 | 12 | 11 |
| 9 | 0 | 1 | 2 | 3 | 8 | 13 | 10 |
| 10 | 2 | 3 | 4 | 5 | 11 | 14 | 9 |
| 11 | 2 | 3 | 4 | 5 | 10 | 15 | 8 |
| 12 | 0 | 1 | 6 | 7 | 8 | 13 | 14 |
| 13 | 0 | 1 | 6 | 7 | 9 | 12 | 15 |
| 14 | 2 | 3 | 6 | 7 | 10 | 12 | 15 |
| 15 | 2 | 3 | 6 | 7 | 11 | 13 | 14 |

In one embodiment, the wireless terminal 100 takes the subspace distance as the ranking metric into account as follows. The wireless terminal 100 selects index $i_2$ (m−1) for subband (m−1). For subband m, the only set of candidates the wireless terminal 100 evaluates for selection is given by the set $S_{i_2}=\{i_2(m-1)\} \cup A_{i_2}$, where $$A_{i_2} = \bigcup_{i=1}^{7} \{k_i(i_2)\}$$

and $k_i(i_2)$, $i_2$=0, 1, . . . , 15 as shown in Table 5. In other words, $i'_2$ belongs to a subset of the first codebook and includes the first precoding index $i_2$.

The $W_1(n)$=diag$\{X_n, X_n\}$ structure that is common to Solution 1 and Solution 2 has the component matrix:

$$X_n = \begin{bmatrix} 1 & 1 & 1 & 1 \\ q_1^n & q_1^{n+8} & q_1^{n+16} & q_1^{n+24} \end{bmatrix}.$$

$W_1(n)$ and $W_1(n+8)$ have the same columns except for a cyclic shift (i.e., the columns of $W_1(n+8)$ are cyclically left-shifted version of the columns of $W_1(n)$ for 0≤n≤7).

For rank 1, $W_2$ includes a beam-selection component matrix Y that can choose any beam for antenna port pairs (#15, #16) and (#17, #18) but with a phase offset for one co-polarized pair with respect to the other. The beam-space matrix $W_1(n)$ can be compressed to 3 bits (e.g., PUCCH 1-1 submode 1 and submode 2) for rank 1 (i.e., if the last reported RI is 1) with a potential degradation in performance. This suggests a sub-sampling of the form $I_{PMI}$=mod$(i_1, 8)$, where $I_{PMI}$ represents the sub-sampled PMI and $i_1 \in \{0, 1, \ldots, 15\}$ is the PMI index for $W_1$. In other words, for rank 1, from the value of the first PMI, $I_{PMI1} \in \{0, 1, \ldots, 7\}$, the codebook index $i_1$ is determined as $i_1 = I_{PMI1}$.

For rank 2, however, due to the restrictions on $W_2$, $W_1(n)$ and $W_1(n+8)$ different overall codebooks ($W_1 W_2$) result for both Solution 1 and Solution 2 when $W_2$ takes on different values. For solution 1, the allowed pairs of columns of $X_n$ that can be selected for $(Y_1, Y_2)$ are (1,1), (2,2), (3,3), (4,4), (1,2), (2,3), (1,4), (2,4). The allowed pairs of columns of $X_{n+8}$ (using the column indexes of $X_n$) are therefore (1,1), (2,2), (3,3), (4,4), (2,3), (3,4), (2,1), (3,1). One pair (1,2) has swapped $Y_1$ and $Y_2$, and two other pairs (1,4) and (2,4) are replaced with different pairs (3,4) and (3,1). The remaining 5 pairs are common. However, there are different co-phasings of $Y_1$ and $Y_2$ that lead to some common beams for different (mod$(i_1, 8), i_2$) and (mod$(i_1, 8)$+8, $i_2$) combinations. If the sub-sampling $I_{PMI}$=mod$(i_1, 8)$ is adopted, then for $W_1(n)$ and $W_1(n+8)$, all of the 32 columns (for each of layer 1 and layer 2) occurring in the precoder set generated using $W_1(n)$ appear as columns in the precoder set generated using $W_1(n+8)$. Furthermore, 10 of the 16 rank-2 product $W_1 W_2$ matrices appear commonly in the precoder sets generated using $W_1(n)$ and $W_1(n+8)$.

In some embodiments, the sub-sampling described above can result in a performance loss for rank 2. Thus, for both Solution 1 and Solution 2, if compression is not desired (e.g., in PUSCH 3-2), then 3 bits can be used for $W_1$ feedback under rank 1, and 4 bits can used for $W_2$ feedback under rank 2.

It is possible that the degradation due to sub-sampling is smaller for rank 1 than it is for rank 2. Accordingly, in an embodiment, the wireless terminal 100 determines the precoding index $i_1$ based on the reference signal received from the first base station 102, where $i_1$ is an index pointing to a first codebook, and where the elements of the codebook can be represented by K=4 bits. If the preferred transmission rank is 1 or if the last reported RI corresponds to rank 1, then the wireless terminal 100 can transmit a report that includes an M=3 (<K) bit representation of $i_1$ to the second base station 104 (or some other M such that M is different from K). Alternatively, if the preferred transmission rank is 2 or if the last reported RI corresponds to rank 2, then the wireless terminal 100 can transmit a K=4 bit representation of $i_1$ to the second base station 104.

In an embodiment, for PUCCH 1-1, submode 1, when sub-sampling is desired, the wireless terminal 100 uses 3 bits for the first PMI by reporting $I_{PMI}$=mod$(i_1, 8)$ with 1 bit for RI (for rank 1/2) and 2-bit RI (for rank 3/4). For PUCCH 1-1 submode 2, 3 bits can be used for the first PMI by reporting $I_{PMI}$=mod$(i_1, 8)$. The wireless terminal 100 may need to carry out compression for the second PMI ($W_2$) for rank 2 to ensure that the payload size is 11 bits. For PUCCH 2-1, the wireless terminal 100 may need to carry out compression for a second PMI as well. For PUCCH 1-1 submode 2 and PUCCH 2-1, where the wireless terminal 100 may need to carry out compression for the second PMI, a simple co-phasing structure for $W_2$ such as:

$$W_2 = \frac{1}{\sqrt{2}}\begin{bmatrix} Y \\ Y \end{bmatrix}, \frac{1}{\sqrt{2}}\begin{bmatrix} Y \\ -Y \end{bmatrix}$$

for rank 1 and:

$$W_2 = \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix}$$

for rank 2 (which is the common co-phasing structure for both Solution 1 and Solution 2) may be appropriate. In one embodiment, the vectors Y, $Y_1$, and $Y_2$ can be set equal to $e_1$ which selects the first and fifth column of $W_1$.

Figure 3:
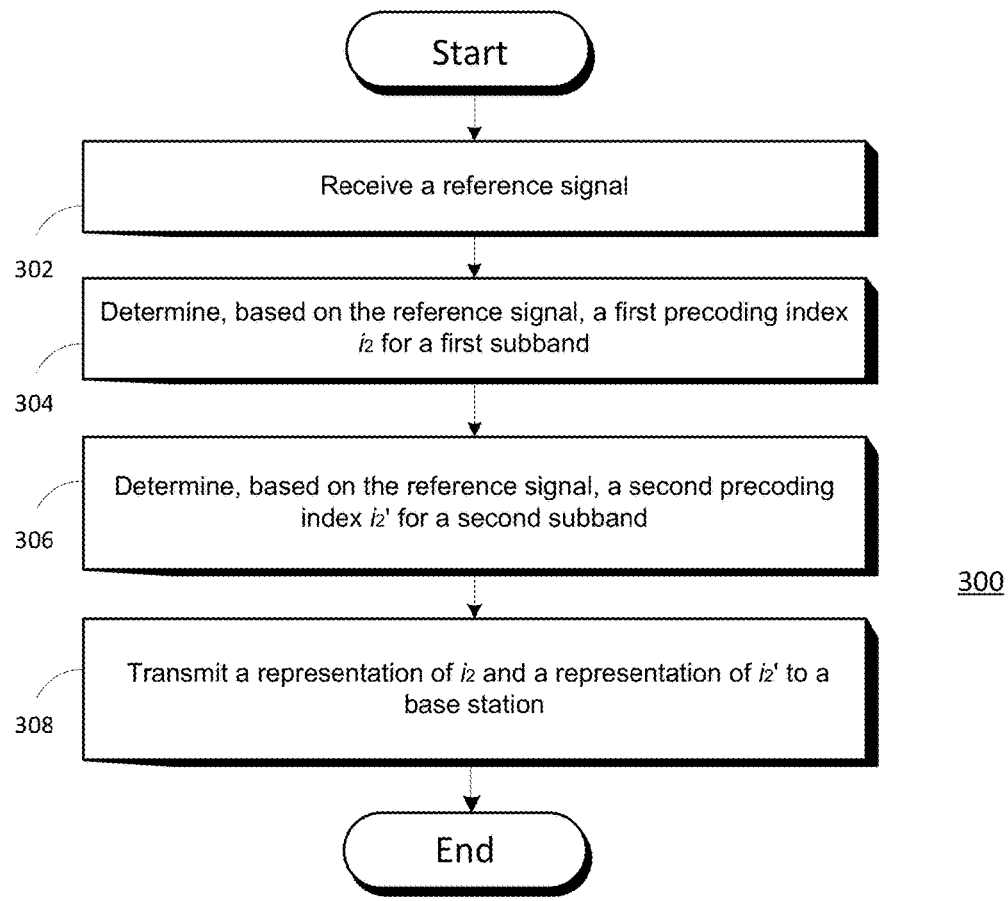
FIG. 3 is a flowchart showing a method of codebook sub-sampling carried out by a wireless terminal.

Turning to FIG. 3, a flowchart 300 illustrates an embodiment of the disclosure. At step 302, the wireless terminal 100 receives a reference signal (e.g., from the first base station 102). At step 304, the wireless terminal 100 determines, based on the reference signal, a first precoding index $i_2$ for a first subband. $i_2$ is an index of a first codebook. At step 306, the wireless terminal 100 determines, based on the reference signal, a second precoding index $i'_2$ for a second subband. In an embodiment, $i'_2$ is an index for the first codebook and belongs to the set $\{\text{mod}(i_2-K_1+k,K), k=0, 1, \ldots, K_2\}$, where $K_1>1$, and $K_2>1$ and $K>1$ are integers. In one implementation, $K_1<K_2<K$ (e.g., $K_1=3$, $K_2=7$, and $K=16$). At step 308, the wireless terminal 100 transmits a representation of $i_2$ and a representation of $i'_2$ to a base station (e.g., the base second station 104).

Figure 4:
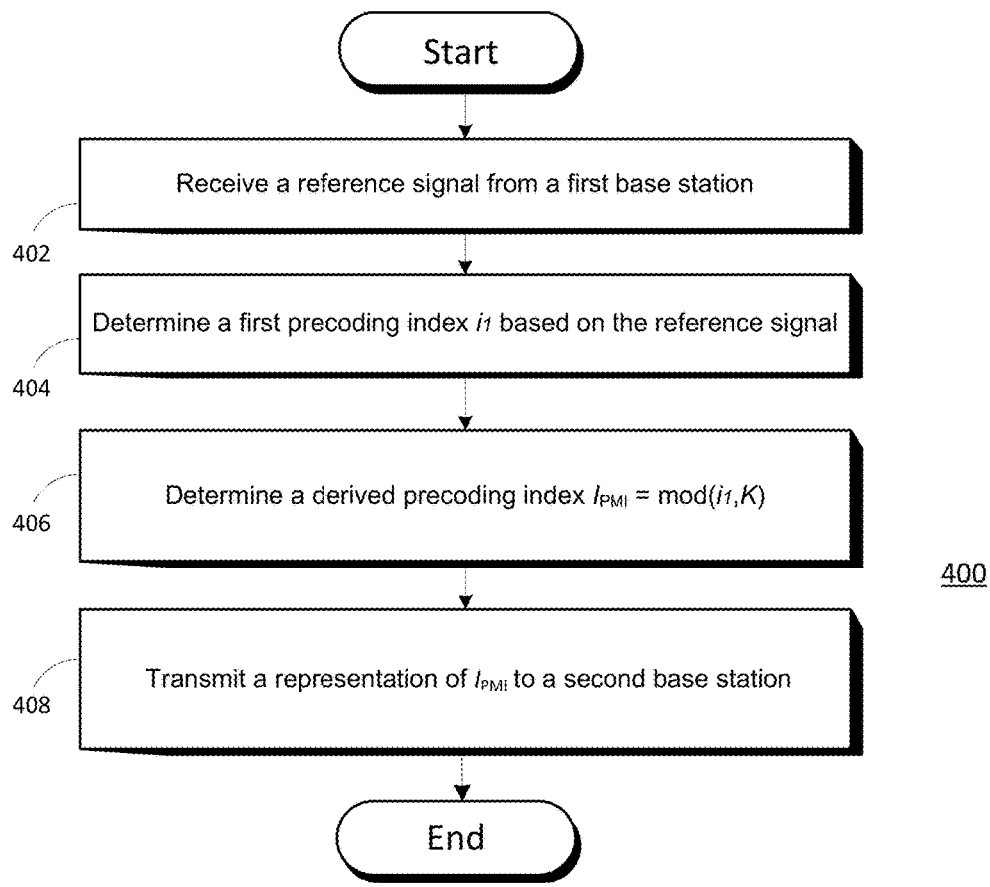
FIG. 4 is a flowchart showing another method of codebook sub-sampling carried out by a wireless terminal.

Turning to FIG. 4, a flowchart 400 illustrates an embodiment of the disclosure. At step 402, the wireless terminal 100 receives a reference signal from the first base station 102. At step 404, the wireless terminal 100 determines a first precoding index $i_1$ based on the reference signal, wherein $i_1$ points to an element of a first codebook. At step 406, the wireless terminal 100 determines a derived precoding index $I_{PMI}=\text{mod}(i_1,K)$, wherein $K>1$ is an integer. At step 408, the wireless terminal 100 transmits a representation of $I_{PMI}$ to the second base station 104.

Figure 5:
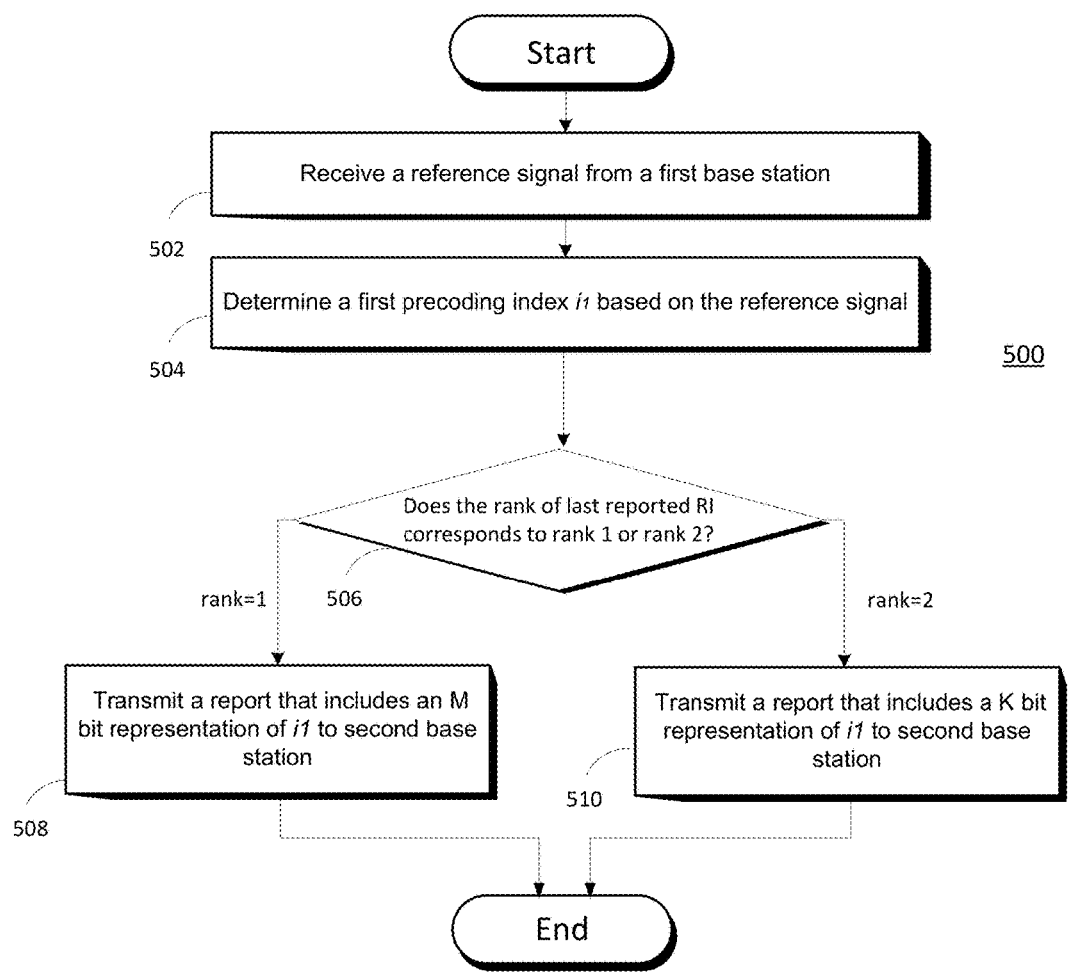
FIG. 5 is a flowchart showing yet another method of codebook sub-sampling carried out by a wireless terminal.

Turning to FIG. 5, a flowchart 500 illustrates an embodiment of the disclosure. At step 502, the wireless terminal 100 receives a reference signal from the first base station 102. At step 504, the wireless terminal 100 determines a first precoding index $i_1$ based on the reference signal. The first precoding index $i_1$ is an index of a first codebook. Elements of the first codebook can be represented by K bits. If, at step 506, the last reported RI corresponds to rank 1, then, at step 508, then the wireless terminal 100 transmits, to the second base station 104, a report that includes an M-bit representation of $i_1$. If, at step 506, the last reported RI corresponds to rank 2, then the wireless terminal 100 transmits, to the second base station 104, a report that includes a K-bit representation of $i_1$, wherein M<K at step 510.

In some embodiments, the wireless terminal 100 carries out periodic CSI reporting. For example, the wireless terminal 100 may have two reporting instances (a first and a second reporting instance) each with its own periodicity (a first periodicity and a second periodicity). The first reporting instance is in a first uplink subframe, and the second reporting instance is in a second uplink subframe. The first uplink subframe and the second uplink subframe can occur at different times. The first and second periodicities may be different from one another. Thus, for example, the wireless terminal 100 can send a representation of a precoding index in a first CSI report on a first uplink subframe and send a representation of another precoding index in a second CSI report on a second uplink subframe (e.g., $i_2$ in a first CSI report and $i'_2$ in a second CSI report, or $i_1$ in a first CSI report and $i_2$ in a second CSI report). The first and second uplink subframes can be identical. Likewise, the first and second CSI reports can be identical.

In one example, the wireless terminal 100 carries out wideband CQI and wideband PMI periodic reporting. In one mode of operation, the wireless terminal 100 transmits a first CSI report on a first reporting instance with the first periodicity. The first CSI report includes an RI and a first PMI. The first PMI is a representation of the first index ($i_1$) The wireless terminal 100 may transmit a second CSI report on the second reporting instance with the second periodicity. The second CSI report includes the wideband CQI and the second PMI. The second PMI is a representation of the second index ($i_2$).

In another mode of operation, the wireless terminal 100 may transmit a first CSI report including RI on the first reporting instances with the first periodicity. The wireless terminal 100 may transmit a second CSI report including the wideband CQI and PMI, the PMI being a representation of the first index ($i_1$) and the second index ($i_2$) on the second reporting instances with the second periodicity.

In another embodiment, the wireless terminal 100 carries out subband CQI and PMI periodic reporting. In doing so, the wireless terminal 100 determines a PTI and transmits a first CSI report including an RI and the PTI on the first reporting instance with the first periodicity. The wireless terminal 100 uses the PTI to indicate the contents of the CSI reports on the second reporting instances with the second periodicity until the next CSI report containing the RI and the PTI. If the most recently transmitted PTI is set to 0, then the wireless terminal 100 transmits a second CSI report on a subset of the second reporting instances with a third periodicity (e.g., third periodicity=k*second periodicity, k being an integer). If the most recently transmitted PTI is set to 0, then the second CSI report includes a first PMI, the first PMI being a representation of the first index ($i_1$). Between every two consecutive first and second PMI reports on the second reporting instances (with the second periodicity), the wireless terminal 100 transmits a third CSI report, which includes a wideband CQI and a second PMI that assumes transmission on a wideband channel bandwidth, the second PMI being a representation of the second index ($i_2$). In the case of a CSI report collision (due to the wireless terminal 100 being configured with multiple carriers (carrier aggregation) or multiple serving cells), the wireless terminal 100 transmits a CSI report of only one serving cell with the CSI report including only the representation of the first index ($i_1$) with a higher priority than other CSI reports.

If the most recently transmitted PTI is set to 1, then the wireless terminal 100 transmits the second CSI report on a subset of the second reporting instances with a fourth periodicity (e.g., fourth periodicity=m*second periodicity, m being an integer), the second CSI report including the wideband CQI and the third PMI, the third PMI being a representation of the second index ($i_2$) that assumes transmission on a wideband channel bandwidth. The fourth periodicity can be different from the third periodicity. Between every two consecutive wideband CQI and wideband second PMI reports on the second reporting instances with the second periodicity, the wireless terminal 100 transmits a fourth CSI report including a subband CQI and a fourth PMI assuming transmission on a subband channel bandwidth, the fourth PMI being a representation of the second index ($i_2$).

In another embodiment, if the most recently transmitted PTI is set to 0, then the wireless terminal 100 transmits a second CSI report on a subset of the second reporting instances with a third periodicity (e.g., third periodicity=k*second periodicity, k being an integer). The second CSI report includes a first PMI, the first PMI being a representation of the first index ($i_1$). Between every two consecutive first and second PMI reports on the second reporting instances with the second periodicity, the wireless terminal 100 transmits a third CSI report including a wideband CQI and a second PMI that assumes transmission on a wideband channel bandwidth, the second PMI being a representation of the second index ($i_2$). If the most recently transmitted PTI is set to 1, then the behavior of the wireless terminal 100 is the same as described in the previous mode of the operation above.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method in a wireless terminal, the method comprising:
   receiving a reference signal from a first base station;
   determining a first precoding index $i_1$ corresponding to a first precoding matrix based on the reference signal, wherein $i_1$ is an index of a first codebook;
   determining a derived precoding index $I_{PMI}=\mathrm{mod}(i_1,K)$, wherein K>1 is an integer; and
   transmitting a representation of $I_{PMI}$ to a second base station.

2. The method of claim 1 further comprising:
   determining a second precoding index $i_2$ based on the reference signal, wherein the second precoding index $i_2$ is an index of a second codebook, and wherein the first precoding index and the second precoding index jointly determine a precoding matrix with a product structure.

3. The method of claim 1 further comprising:
   transmitting a channel quality indication to the second base station, wherein the channel quality indication information refers to one or more spatial layers, and wherein the channel quality indication is conditioned on $I_{PMI}$.

4. The method of claim 1 wherein transmitting the representation of $I_{PMI}$ to the second base station comprises:
   transmitting a first channel-state information report including a representation of $i_1$ in a first uplink subframe to the second base station; and
   transmitting a second channel-state information report including at least a representation of $i_2$ in a second uplink subframe to the second base station.

5. The method of claim 4 wherein the first and second channel-state information reports are transmitted with different periodicities.

6. The method of claim 1 wherein transmitting the representation of $I_{PMI}$ to the second base station comprises transmitting the representation of $I_{PMI}$ to the second base station over a physical uplink control channel or a physical uplink shared channel.

7. A wireless terminal comprising:
   at least one transceiver operative to receive a reference signal from a first base station;
   a controller, operatively coupled to the at least one transceiver operative to:
      determine a first precoding index $i_1$ corresponding to a first precoding matrix based on the reference signal, wherein $i_1$ is an index of a first codebook; and
      determine a derived precoding index $I_{PMI}=\mathrm{mod}(i_1,K)$, wherein K>1 is an integer; and
   at least one transceiver operative to transmit a representation of $I_{PMI}$ to a second base station.

8. The wireless terminal of claim 7 wherein the controller is further operative to:
   determine a second precoding index $i_2$ based on the reference signal, wherein the second precoding index $i_2$ is an index of a second codebook, and wherein the first precoding index and the second precoding index jointly determine a precoding matrix with a product structure.

9. The wireless terminal of claim 7 further comprising the controller operative to cause one of the at least one of the transceivers to transmit:
   a channel quality indication to the second base station, wherein the channel quality indication information refers to one or more spatial layers, and wherein the channel quality indication is conditioned on $I_{PMI}$.

10. The wireless terminal of claim 7 wherein transmitting the representation of $I_{PMI}$ to the second base station comprises:
    transmitting a first channel-state information report including a representation of $i_1$ in a first uplink subframe to the second base station; and
    transmitting a second channel-state information report including at least a representation of $i_2$ in a second uplink subframe to the second base station.

11. The wireless terminal of claim 10 wherein the first and second channel-state information reports are transmitted with different periodicities.

12. The wireless terminal of claim 7 wherein transmitting the representation of $I_{PMI}$ to the second base station comprises transmitting the representation of $I_{PMI}$ to the second base station over a physical uplink control channel or a physical uplink shared channel.

* * * * *